United States Patent [19]

Tait

[11] 3,718,858

[45] Feb. 27, 1973

[54] ELECTRICAL TESTING METHODS AND APPARATUS

[76] Inventor: David Adams Gilmor Tait, 34 Mount Street, Dorking, Ireland

[22] Filed: April 27, 1971

[21] Appl. No.: 137,891

[30] Foreign Application Priority Data

April 27, 1970 Great Britain.....................20,185/70

[52] U.S. Cl. ...............................................324/60 C
[51] Int. Cl. ...............................................G01r 27/26
[58] Field of Search...................................324/60, 61

[56] References Cited

UNITED STATES PATENTS 2,455,543  12/1948  Williams............................324/60 R Primary Examiner—Alfred E. Smith
Attorney—Woodhams, Blanchard and Flynn

[57] ABSTRACT

A method and means for insulation resistance testing wherever a unidirectional test voltage is intermittently applied to a capacitive circuit under test connected in shunt to a high quality coupling capacitor serving as a reference and connected to a chopper amplifier operated at half the frequency of the supply voltage source and active only during the measuring period when the test voltage is removed. A bias current is injected at the amplifier input or output to set a reference level of resistance, and a toggle device responds when the test circuit fails to reach the standard required.

19 Claims, 6 Drawing Figures

DAVID A. G. TAIT

Woodhams, Blanchard & Flynn

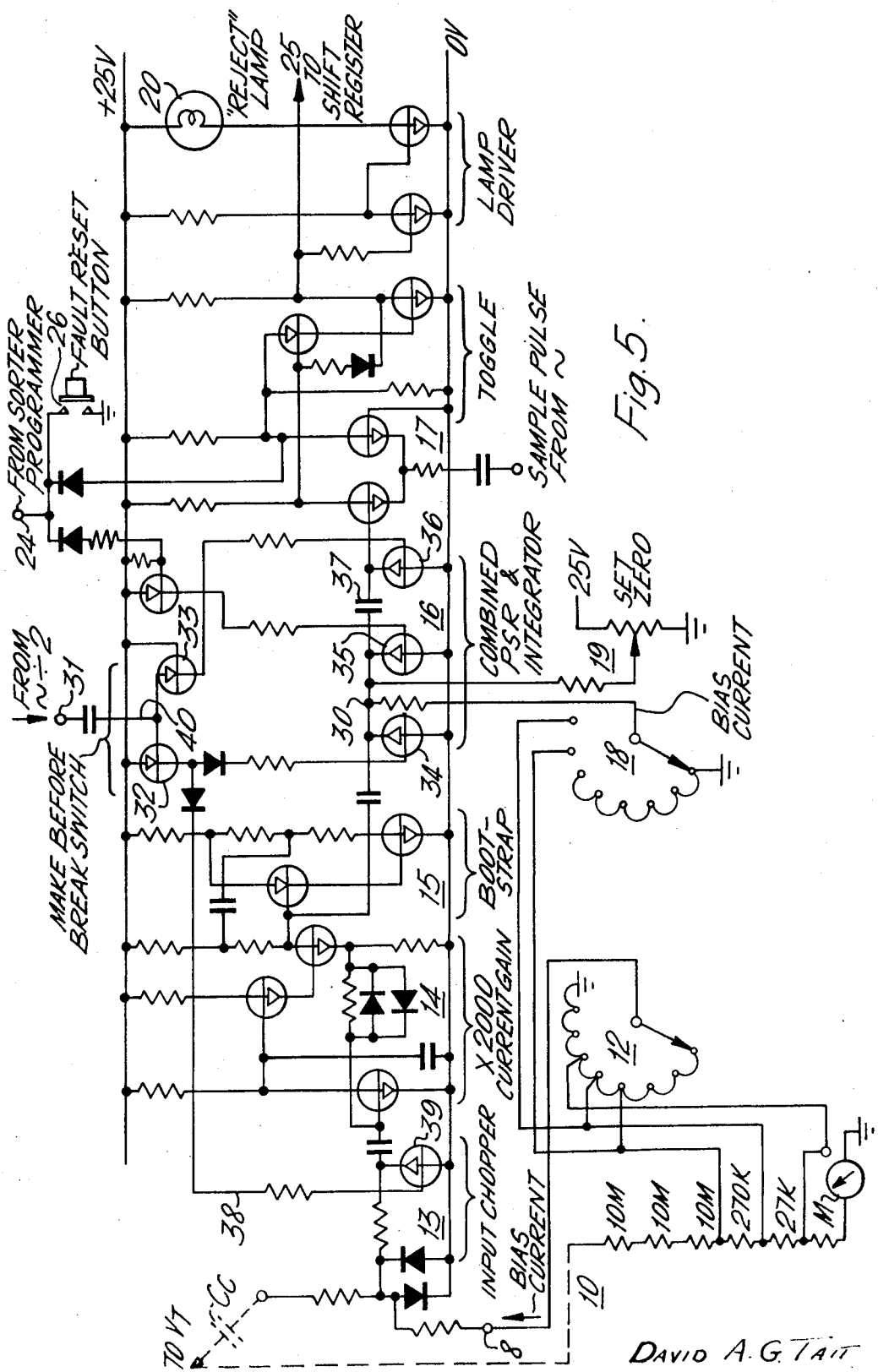

ELECTRICAL TESTING METHODS AND APPARATUS

The invention relates to electrical testing methods and apparatus.

It is often necessary to test materials or surface or electrical circuits, or components, more particularly capacitors, for leakage of electrical charge. The present invention is particularly concerned with methods and means for performing such tests, and in this specification the expression test circuit is intended to mean the circuit under test, it being understood that this may include a capacitive circuit or, more usually, a capacitor.

Instruments already exist for testing capacitors, which operate by measuring the current that flows into the capacitor when a voltage is maintained across it. This arrangement suffers from two disadvantages, one of which is that time must elapse before very small leakage currents can be measured because the initial charging current of the capacitor may be many times greater than the leakage. The second disadvantage is that the supply voltage to the capacitor must be very stable, or large currents may flow into or out of the capacitor, with the same effect.

It is an object of the present invention to provide a measuring means and method which avoid these drawbacks, and which also permit the measurement to be made in very much shorter time than hitherto.

Stated generally, the principle of the invention is to allow the capacitive circuit to charge for short intervals of time, conveniently, half cycles of a mains supply voltage and to measure the change in the condition of the test circuit occurring during a small part of the non-charging period.

Accordingly the invention consists in a method of insulation resistance testing comprising the steps of applying to a capacitive test circuit a unidirectional test voltage to charge said test circuit, removing the applied test voltage when substantially at peak level, and measuring a change of condition of said test circuit within the non-charging period immediately following the removal of said voltage.

The invention also consists in an insulation resistance tester for performing the method comprising terminals for receiving a capacitive circuit under test, a unidirectional supply source for charging the test circuit up to an arbitrary level of peak voltage and circuit means for measuring a change of voltage or a leakage current from said test circuit. Said insulation resistance tester may include timing means defining a charging period for said test circuit, an immediately following non-charging period, and a measuring period smaller than and so placed within the non-charging period that the voltage applied to the test circuit remains near peak level, for example within 3 percent, and circuit means for measuring a change of condition of said test circuit during said measuring period.

The measurement of the voltage change may be done indirectly by providing a high quality coupling capacitor of known characteristics inshunt with the test circuit and in series with a chopper amplifier having an input impedance which is preferably low compared with the reactance of the coupling capacitor at the chopper frequency. The chopper is phased relative to the supply voltage which charges the capacitor, so that the amplifier is active only during the period that the test capacitor is discharging.

The invention also includes arrangements for measuring the applied voltage at the test circuit and, furthermore, arrangements for indicating whether the component or circuit under test reaches or fails to reach an arbitrary test standard. Such test standard may be achieved by an integrator and/or a toggle device following the chopper amplifier in combination with biasing means settable to a rejection threshold. Said biasing means may develop a reference level of a quantity, for example a biasing current, in terms of which the insulation condition of the test circuit may be compared with that of the reference under the applied test voltage. The measuring arrangements may be devised so that the integrator or toggle turns over at a bias level which may be calibrated as required in terms of "time constant," or "leakage resistance" or "leakage current." These testing arrangements are particularly advantageous when used in conjunction with known sequential test sorting systems having a suitably timed programme to suit the parameters of the testing apparatus.

In practical embodiments of the testing apparatus the means for measuring the voltage applied to the test capacitor may comprise a second rectifier and reservoir capacitor connected to the supply voltage as the test capacitor, this reservoir capacitor having a voltmeter in shunt. The advantage of the reservoir capacitor and shunt voltmeter arrangement is that it avoids placing a burden upon the test capacitor, which would be inevitable with a directly shunted voltmeter across the test capacitor, since even an electrostatic instrument would have some leakage.

The voltage supply for the test apparatus may be from a variable source or from a multiplier chain to achieve very high voltages.

Small resistors may be inserted in series with either or both capacitors to limit initial charge currents or breakdown currents.

The chopper amplifier in combination with the integrator and/or toggle device may be arranged to operate an alarm when the leakage from the test capacitor exceeds some arbitrary amount.

A defined biasing current may be fed either to the input or the output of the amplifier to define a current above which the alarm will operate. This defined current may be derived from a voltage which is proportional to the test voltage, thereby making the alarm threshold level substantially indpendent of the applied voltage.

The rectifier may be replaced by a relay operating in synchronism with the chopper and at supply frequency or some sub-multiple thereof. If the supply is DC, the relay can operate at any frequency.

In a preferred arrangement, a relay is added in series with the rectifier, and operated at half the mains frequency, as is the chopper amplifier. The phase of the chopper frequency relative to the supply frequency is adjusted so that the rectifier conducts in the middle of the period that the relay is conducting. In this way it is contrived that the relay never has to make or break the circuit while current is flowing.

The duration of the active period of the chopper amplifier is made to be exactly equal to one period of the mains supply, and the amplifier is followed by an integrator which thereby gives rejection of interfering mains signals and harmonics. The relay used is preferably a "dry-reed" type having a much lower leakage current than the diode with which it is in series, and therefore overcomes the main disadvantage of the simple rectifier, which is that its reverse leakage current is comparable with the leakage currents it is desired to measure in the test capacitor.

The method and apparatus will be further described with reference to the accompanying drawings, of which FIGS. 1 to 5 correspond to the drawings filed with the Provisional Specification, and in which:

In the figures like reference characters are used for similar components.

FIG. 5 is a more detailed schematic diagram of a leakage current amplifier for a testing circuit suitable for use with a known type of sequential test sorting system.

FIG. 6 is a block schematic of a complete testing system.

Figure 1:
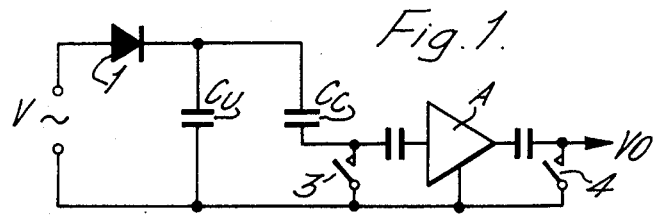
FIG. 1 is a simplified schematic circuit illustrating the general principle.

Referring to FIG. 1, illustrating the basic principle, the test capacitor $C_u$ is charged from supply voltage V through some suitable means for providing short charging pulses, represented in the drawing by the rectifier 1. Leakage measurement is done by a circuit comprising a high quality coupling capacitor $C_c$ in shunt with $C_u$ and connected in series with a chopper amplifier A which is phased so that the choppers 3 and 4 are closed when rectifier 1 is conducting.

Figure 3:
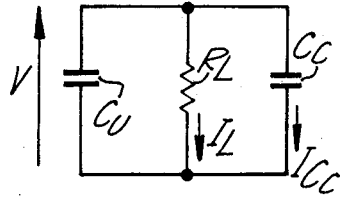
FIGS. 3 and 4 are equivalent circuits for explaining the theory.

Considering the equivalent circuit of FIG. 3, during the active period of the chopper amplifier the supply voltage is disconnected from the test capacitor $C_u$. The coupling capacitor $C_c$ is assumed for the moment to have zero leakage. Then $C_u$ and $C_c$ are in parallel and are charged to voltage V. The leakage current is then $$I_L = V/R_L \quad (1)$$

This current flows through the two capacitors in proporation to their capacitance. Thus the current $'C_c$ which is the current measured is given by $$'C_c = I_L C_c/C_u + C_c \quad (2)$$

If $C_u$ is very much less than $CC$, then $$I_{Cc} \simeq I_L \quad (3)$$

Figure 2:
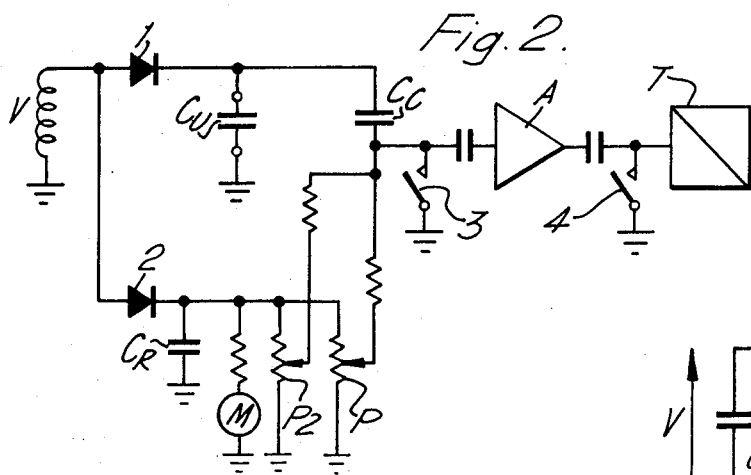
FIG. 2 illustrates, in addition to the circuit of FIG. 1, the means for measuring the applied voltage and for setting the biasing circuit for the amplifier.

In FIG. 2 the circuit of FIG. 1 is supplemented by a circuit for measuring the voltage applied to the test capacitor $C_u$ comprising a second rectifier 2 and a reservoir capacitor $C_R$ with a voltmeter M in shunt. A bias current, which can be set by the potentiometer P is fed into the amplifier A to set a threshold for the leakage current above which an alarm of any suitable known type can be operated by a toggle device T.

Figure 4:
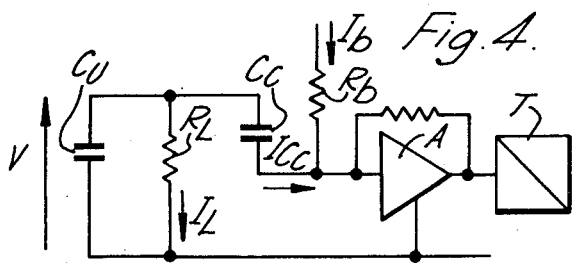

FIG. 4 illustrates an equivalent circuit in which the leakage current and leakage resistance are again designated as $I_L$ and $R_L$, whilst $I_b$ and $R_b$ are the bias current and bias resistance.

A bias current $Ib$ is fed into the virtual earth amplifier "A" to counter the current flowing through Cc. If the bias current is overcome the toggle "T" operates and brings up an alarm, If amplifier "A" is sufficiently sensitive, the alarm will operate when the following condition is satisfied.

$$I_{Cc} \geq I_b \quad (4)$$

or $$I_L \geq I_b(1 + C_u/C_c) \quad (5)$$

which for small values of $C_u$ i.e. $C_u << C_c$ yields $$I_L \geq I_b \quad (6)$$

By driving Rb from a voltage which is a known fraction k of the test voltage V, we have $$Ib = kV/Rb \quad (7)$$

and $$I_L = V/R_L$$

From the above it can be proved quite simply that when $C_c << C_u$ we have the condition that an alarm is given when the "Time constant" ($I_1 = C_u R$) of the test capacitor is less than the effective time constant ($I_2 = (C_c R_b k$ of the coupling capacitor and bias circuit. In this condition $C_c << C_u$ the bias control can be calibrated in terms of "seconds" or "Megohms — microfarads".

It can also be shown that, in the case where $C_c >> C_u$ the bias (or "alarm-level control") can be calibrated directly in terms of leakage resistance. By switching the value of coupling capacitor $C_c$ to be always much greater than, or much less than, the value of the test capacitor $C_u$ and by making appropriate corrections to the calibration of the bias control, either "time-constant" or "leakage resistance" or "leakage current" designations may be applied to the bias control. Any unavoidable leakage current in $C_c$ may be countered by an extra bias current derived from the test voltage V in similar fashion to the "alarm-level control," which is adjustable by a "set zero control" $P_2$. These bias currents can, as already indicated in FIG. 2 be derived from a second rectifier 2 and reservoir capacitor $C_R$. A "set zero" bias may also be derived by an adjustable tapping on a constant voltage source. The meter supply is similarly arranged to avoid loading the test capacitor.

FIG. 5 illustrates a practical embodiment of a leakage current amplifier-detector for capacitors, suitable for use with a known type of sequential test sorting system. In FIG. 5 a variable high voltage multiplier chain 10 charges a test capacitor $C_u$ to the peak voltage monitored on a meter M. The test voltage may, for example, have adjustable ranges of 0 to 300V and 0 to 3kV. During reverse half-cycles of the supply the test capacitor $C_u$ discharges through its own leakage. The coupling capacitors and test capacitor $C_u$ are connected to the input chopper 13 and amplifiers 14, followed by a boot strap amplifier 15, giving a high output impedance, a sampling integrator 16 and a toggle 17. An adjustable bias current proportional to the test voltage may be applied from potentiometer 12 to the amplifier input at 8.

The drive for the amplifier choppers is derived from a divide-by-two circuit 7 (FIG. 6) producing a drive frequency of 25 Hz from the mains frequency of 50 Hz, which is applied to the amplifier of FIG. 5 at the point 31. The drive frequency is taken through lead 38 to the input chopper transistor 39. At the output side of the amplifier the drive frequency is applied to a pair of chopper transistors 34 and 36. The incoming 25 Hz chopper transistors 34 and 36. The incoming 25 Hz lead 40 is connected to the base of transistor 32 and the emitter of transistor 33. The collector of transistor 32 is connected through a diode and a suitable resistor to the base of the first chopper transistor 34. The collector of transistor 33 is connected through a similar resistor to the base of the second chopper transistor 36, the emitters of the respective transistors 34 and 36 being connected to the plates of an integrating capacitor 37. The arrangement functions as a combined phase sensitive rectifier and integrator converting the chopped current for the capacitor 37. Transistor 35 connected to the point 30 at one side of the capacitor 37 serves to empty the latter at the appropriate times.

The toggle device 17 operates and indicator lamp 20 should the leakage exceed a pre-set limit level. A "set-zero" bias is applied at point 30 from a constant voltage source by potentiometer 19. The fault indicator lamp is reset by a push button 26. As an alternative to injecting a bias current to the input point 8 of the amplifier (FIG. 5), a bias current, may, instead, be applied at the amplifier output from the potentiometer 18. By making the limit level, as determined by the bias current, proportional to the test voltage the limit control can, as hereinbefore explained, be calibrated in terms of "- time-constant," (Ohms × Farads) for the test capacitor $C_u$. It also has been shown above that this relationship is true for values of test capacitor $C_u$ much greater than the coupling capacitor $C_c$.

Figure 6:
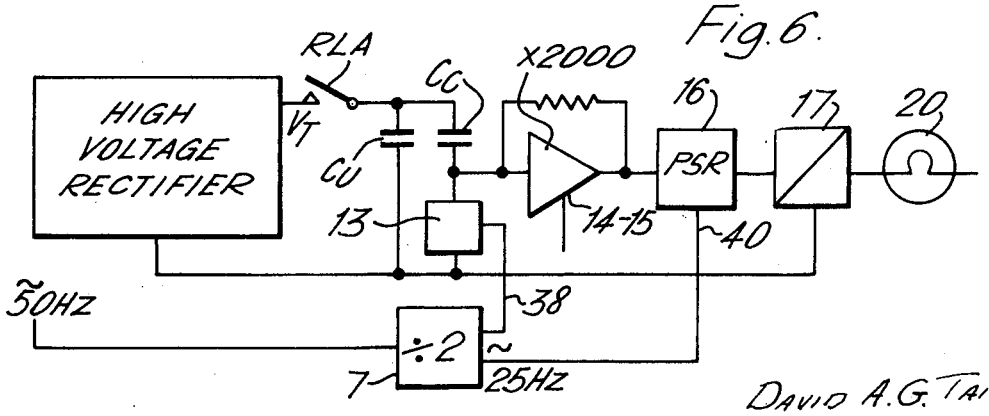

The test apparatus is shown in the block schematic diagram of FIG. 6, where the high voltage rectifier delivers the test voltage $V_T$, and the remainder of the components, where they correspond to those of FIGS. 1 to 5, are indicated by similar reference characters.

Because a limitation to accuracy is the reverse leakage of the final rectifier in the high voltage multiplier (about 10$n$A), a relay RLA, preferably a reed relay, is used in series with the rectifier, and driven at one half the mains frequency, i.e. at 25 Hz. This frequency allows the making the breaking of the reed contact to take place while the diode is non-conducting (i.e. no current is broken by the reed) and also allows the integrator 16 to operate over a complete mains cycle, thus effectively filtering out any mains interference.

The reed relay has an effective 'off'-resistance much greater than the nominal $10^{12}$ ohms because it has only a fraction of the test voltage appearing across it. As compared with this, the rectifier leakage current is substantially independent of voltage, and its effective resistance is in proportion to the applied test voltage.

The capacitor testing circuit can be arranged for use with any of the known sequential test sorting systems. The pulse from the test sorting programmer is applied at 24, and a three stage shift register, not shown in the drawing, but of known type, is connected to terminal 25 to act as a memory to give the reject signal at the time that the component reaches the sorting position. This register is arranged to be stepped by the contact-closures from the programme unit (not shown), actually by the later edge of the pulse, so that stepping is accomplished some time after the component has reached the voltage test station. The reject toggles are reset at the same time and the integrator capacitor 37 is emptied. A reject can be registered at any time after the end of the programme pulse.

When the test component is first connected, a transient is caused by the partial discharge of the coupling capacitor $C_c$. This discharge may have a time constant of 1 msecond and is independent of the size of the test capacitor. This transient is masked by the programme pulse, or if not, it can be ignored by arranging that the integrator 16 driven by the chopper amplifier 13—14 is sampled at a suitable delay time after the initial connection.

What we claim is:

1. A method of testing the insulation resistance of a capacitive test circuit comprising the steps of applying to the capacitive test circuit and to a capacitive reference circuit of known insulation resistance coupled in parallel with the test circuit a source of a unidirectional test voltage to charge said test circuit and said reference circuit, removing the source of test voltage when the test circuit and reference circuit are charged substantially to the peak level of the test voltage, and measuring the current flow between the test circuit and the reference circuit within the non-charging period following the removal of said voltage to provide an output signal representative of the insulation resistance of the test circuit.

2. An insulation resistance tester comprising a capacitive reference circuit of known insulation resistance, terminals for receiving a capacitive circuit under test and for coupling the test circuit in parallel with the reference circuit, a unidirectional supply voltage source for charging the test circuit and reference circuit to an arbitrary level of peak voltage, timing circuit to an arbitrary level of peak voltage, timing means defining a charging period for said test circuit and reference circuit, an immediately following non-charging period, and a measuring period smaller than and so placed within the non-charging period that the test circuit is still charged near peak level at the beginning of the measuring period, and circuit means for measuring a current flow between said test circuit and said reference circuit during said measuring period to provide an output signal representative of the insulation resistance of the test circuit.

3. An insulation resistance tester according to claim 2, further comprising means for delaying the start of the measuring period by a small settling time to allow for the decay of transients.

4. An insulation resistance tester according to claim 3 wherein the delay is such that the change of voltage between the end of the charging period and the commencement of the measuring period is less than 3 percent of the peak voltage applied to the test circuit.

5. An insulation resistance tester according to claim 2, further comprising biasing means for developing a reference level of a quantity in terms of which the insulation resistance of the test circuit may be compared with that of the reference circuit.

6. An insulation resistance tester according to claim 5, wherein the capacitive reference circuit includes a coupling capacitor connected in shunt with the circuit under test, and in series with the chopper amplifier, and the timing means is arranged to short circuit both the input and output of the amplifier during the charging periods.

7. An insulation resistance tester according to claim 6, including means for comparing a leakage current of the test circuit with an opposing presettable bias current set up by the biasing means at the amplifier input.

8. An insulation resistance tester according to claim 5 wherein the charging means includes a high voltage multiplier chain having a final rectifier and a relay in series therewith driven in synchronism with the chopper amplifier and so phased that the making and breaking of the charging circuit occurs while the rectifier is non-conducting.

9. An insulation resistance tester according to claim 8, wherein the relay is a dry reed type relay.

10. An insulation resistance tester according to claim 5 including means for delivering an "accept" or "reject" signal according to the magnitude of the output signal said means including an amplifier followed by an integrator and dichotomizer.

11. An insulation resistance tester according to claim 2, wherein the timing means comprises a chopper amplifier which is phased with reference to the supply voltage so that the amplifier is active only within the non-charging period.

12. An insulation resistance tester according to claim 11, wherein the test voltage is derived from a rectified half-wave supply and the chopper frequency is chosen of such lower frequency than the half wave supply and is so phased with respect to it that the chopper amplifier is active during a measuring period commencing after the end of the charging period with a delay of not greater than one half the period of the half wave supply.

13. An insulation resistance tester according to claim 12, wherein the chopper frequency is one half the frequency of the half wave supply.

14. An insulation resistance tester according to claim 2 also including means for measuring the voltage applied to the test circuit comprising a unidirectional conducting device, a reservoir capacitor with shunt voltmeter, said capacitor and voltmeter being connected to the same voltage supply as the test circuit by said unidirectional conducting device.

15. An insulation resistance tester according to claim 2, including means for delivering an "accept" or "reject" signal according to the magnitude of the output signal said means including an amplifier followed by an integrator and dichotomizer.

16. An insulation resistance tester according to claim 15 including also a toggle circuit to drive visual indicating means.

17. An insulation resistance tester according to claim 15, including an electro-mechanical component selector having a gate driven by the dichotomizer or the toggle circuit.

18. An insulation resistance tester according to claim 17 including means for receiving a synchronizing pulse from a component classifier or sorting machine to reset the dichotomizer or the toggle circuit.

19. An insulation resistance tester according to claim 18 including a chain of delay circuits connected to the synchronizing pulse source and serving to store for a selectable arbitrary period a reject signal delivered from the dichotomizer or toggle circuit.

* * * * *